United States Patent
Gwilliams (10) Patent No.: US 11,720,685 B2
(45) Date of Patent: Aug. 8, 2023

(54) ONE-TOUCH MOBILE PENETRATION TESTING PLATFORM

(71) Applicant: Saudi Arabian Oil Company, Dhahran (SA)

(72) Inventor: John Gwilliams, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1159 days.

(21) Appl. No.: 16/280,722

(22) Filed: Feb. 20, 2019

(65) Prior Publication Data

US 2020/0265144 A1    Aug. 20, 2020

(51) Int. Cl.
*G06F 21/57* (2013.01)
*G06F 11/36* (2006.01)
*H04L 67/025* (2022.01)

(52) U.S. Cl.
CPC ........ *G06F 21/577* (2013.01); *G06F 11/3684* (2013.01); *G06F 11/3688* (2013.01);
(Continued)

(58) Field of Classification Search
CPC .............. G06F 21/577; G06F 11/3684; G06F 11/3688; G06F 11/3692; H04L 67/025; H04L 2221/033
See application file for complete search history.

(56) References Cited

U.S. PATENT DOCUMENTS 7,310,669 B2    12/2007    Webb et al.
2005/0002169 A1    1/2005    Drazic et al.
(Continued)

FOREIGN PATENT DOCUMENTS

EP    3100192    12/2016
WO    WO 2018084808    5/2018

OTHER PUBLICATIONS

Khatibsyarbini, Muhammad, et al. "Test case prioritization approaches in regression testing: A systematic literature review." Information and Software Technology 93 (2018): 74-93. (Year: 2018).*

(Continued)

*Primary Examiner* — S. Sough
*Assistant Examiner* — Joanne G Macasiano
(74) *Attorney, Agent, or Firm* — Fish & Richardson P.C.

(57) ABSTRACT

Systems and methods include a penetration testing device. The device comprises: a memory and a processing unit arranged to perform operations including: determining a device mode of operation from one of a headless and remote mode. In the headless mode, the operations comprise: determining a test script customized for a target application; in response to receiving an instruction to perform a penetration test, executing the script to perform the test on the application; based on results of the test, and compiling data indicative of security vulnerabilities in the application. And in the remote mode, the operations comprise: establishing a secure connection between the device and a remote computing device; receiving from the remote computing device instructions for performing a remote penetration test on the application; performing the instructions to determine the security vulnerabilities of the application; and providing the remote computing device with a compilation of the security vulnerabilities.

20 Claims, 7 Drawing Sheets

(52) U.S. Cl.
CPC ........ *G06F 11/3692* (2013.01); *H04L 67/025* (2013.01); *G06F 2221/033* (2013.01)

(56) References Cited

U.S. PATENT DOCUMENTS

| | | | |
|---|---|---|---|
| 2010/0070230 A1* | 3/2010 | Kumar | G06F 11/3672 |
| | | | 702/119 |
| 2013/0014263 A1* | 1/2013 | Porcello | H04L 63/0272 |
| | | | 726/25 |
| 2013/0117611 A1* | 5/2013 | Chakraborty | G06F 11/3688 |
| | | | 714/33 |
| 2014/0192492 A1 | 7/2014 | Wojick et al. | |
| 2014/0237606 A1* | 8/2014 | Futoransky | G06F 21/552 |
| | | | 726/25 |
| 2015/0261658 A1* | 9/2015 | Douglas | G06F 11/3664 |
| | | | 714/38.1 |
| 2016/0352771 A1 | 12/2016 | Sivan et al. | |
| 2018/0173606 A1* | 6/2018 | Malla | G06F 11/368 |
| 2018/0303003 A1* | 10/2018 | Meinhart | H05K 7/20772 |
| 2019/0245883 A1* | 8/2019 | Gorodissky | G06F 21/577 |

OTHER PUBLICATIONS

Baresi, Luciano, and Mauro Pezze. "An introduction to software testing." Electronic Notes in Theoretical Computer Science 148.1 (2006): 89-111. (Year: 2006).*

Akkiraju, Anurag, et al. "Cybergrenade: Automated exploitation of local network machines via single board computers." 2017 IEEE 14th International Conference on Mobile Ad Hoc and Sensor Systems (MASS). IEEE, 2017. (Year: 2017).*

GCC Examination Report in GCC Appln. No. GC 2020-39210, dated Jul. 17, 2021, 3 pages.

International Search Report and Written Opinion issued in International Application No. PCT/US2020/019021 dated May 15, 2020, 16 pages.

* cited by examiner

ONE-TOUCH MOBILE PENETRATION TESTING PLATFORM

TECHNICAL FIELD

This disclosure relates to systems and methods that improve security assessments of IT infrastructure.

BACKGROUND

For enterprises, securing systems and applications from attacks by malicious users is critical. As part of their security processes, enterprises perform security testing on their systems and applications. Much of this testing is risk-based testing that focuses on the highest value or highest risk assets. However, ultimately, enterprises would like to ensure that every IT component is secure. To do so, enterprises aim to test all of their systems and applications over a period of time. However, doing so places an inordinate amount of resourcing pressure on security teams to deliver quality security assessments in a cost effective manner.

Security teams use a variety of security tools to help them deliver security assessments in an efficient and cost effective manner. One example of a security tool is Automated Vulnerability Assessments (AVAs) that perform automated assessments of some known security vulnerabilities. However, although AVAs provide great breadth of testing, the assessments that they perform have limited depth and access. Therefore, this tool is limited in scope and utility.

SUMMARY

The present disclosure describes methods and systems, including computer-implemented methods, computer program products, and computer systems for performing a penetration test using a mobile penetration testing device. The penetration testing device may include memory and a processing unit that is arranged to perform operations including: determining a mode of operation for the penetration testing device from one of a headless mode and a remote mode. If the determined mode of operation is the headless mode, the operations further include: determining a penetration test script customized for a target application; in response to receiving an instruction to perform an autonomous penetration test, executing the penetration test script to perform the autonomous penetration test on the target application; based on results of the autonomous penetration test, compiling data indicative of security vulnerabilities in the target application; and storing the compiled data in the memory. And if the determined mode of operation is the remote mode, the operations further include: establishing a secure connection between the penetration testing device and a remote computing device; receiving from the remote computing device instructions for performing a remote penetration test on the target application; performing the instructions to determine the security vulnerabilities of the target application; and providing the remote computing device with a compilation of the security vulnerabilities.

Other implementations of this aspect include corresponding computer systems, apparatuses, and computer programs recorded on one or more computer storage devices. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each, optionally, include one or more of the following features, alone or in combination:

A first aspect, combinable with the general implementation, where determining a penetration test script includes: receiving a preconfigured penetration test script from a removable media device connected to the penetration testing device.

A second aspect, combinable with any of the previous aspects, where determining a penetration test script includes: providing one or more values for one or more parameters in a template script stored in the memory; and based on the one or more values and the template script, generating the penetration test script.

A third aspect, combinable with any of the previous aspects, where the one or more parameters include: an IP range, DNS data, a scan option, and an intensity setting.

A fourth aspect, combinable with any of the previous aspects, where the penetration testing device is housed in a rugged case, and wherein one or more connectors are integrated into the rugged case.

A fifth aspect, combinable with any of the previous aspects, where information indicative of one or more protocols are stored in memory, and where the penetration testing device supports the one or more protocols.

A sixth aspect, combinable with any of the previous aspects, where executing the penetration test script includes: scanning the target application to map the target application; based on a map of the target application, performing a series of tests to identify and evaluate potential vulnerabilities; and determining which of the potential vulnerabilities are the security vulnerabilities.

A seventh aspect, combinable with any of the previous aspects, where the series of tests comprise a test to validate false positives.

An eight aspect, combinable with any of the previous aspects, where the series of tests evaluate whether any of the potential vulnerabilities are known exploitable vulnerabilities.

A ninth aspect, combinable with any of the previous aspects, where the series of tests detect vendor specific default credentials and remote login prompts.

A tenth aspect, combinable with any of the previous aspects, where the penetration testing device further includes a display, and where in response to receiving an instruction to perform an autonomous penetration test, executing the penetration test script to perform the autonomous penetration test on the target application includes: providing on the display a selectable icon for initiating execution of the preconfigured penetration test script by the penetration testing device; and in response to determining that the selectable icon has been selected, generating the instruction to perform the autonomous penetration test.

The details of these and other aspects and implementations of the present disclosure are set forth in the accompanying drawings and the following description. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

The following detailed description describes systems and methods that improve delivery of front-line IT security services, and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

In addition to AVAs, security teams perform security assessments using a tool known as penetration testing (also referred to "pentesting"). Traditionally, pentesting involves a skilled technician performing an on-site manual security assessment, called a penetration test or pentest, of a target application. In a pentest, the technician performs detailed tests and controlled exploitations in order to detect security vulnerabilities in the target application. Because of the detailed nature of pentesting, it can consume valuable resources, such as time, labor, computing, and network resources. For instance, it can take the skilled technician several days of pentesting the target application in order to obtain useful results.

Because of its resource-intensive nature, in many scenarios it can be difficult to use pentesting to perform security assessments. As an example, some environments that require testing are physically remote or dangerous, and it can be difficult, expensive, and/or time consuming to provide the resources required for traditional pentesting in such environments. As another example, it can be difficult to test enclaved networks that cannot be accessed by remote scanner tools.

Disclosed herein is a mobile penetration testing device (also referred to as a "pentesting device") that facilitates pentesting with fewer resources than traditional pentesting, thereby overcoming the limitations of traditional pentesting. At a high level, the pentesting device can be disposed in any environment in which a target application is located. Once directly coupled to the target application, the pentesting device can operate in one of two modes. In the first mode, referred to as a "headless mode," the pentesting device can autonomously perform a pentest on the target application (without the need for a skilled user). In the second mode, the pentesting device facilitates for a skilled technician to remotely perform the pentest, perhaps by establishing a secure connection between the pentesting device and a computing device operated by the skilled technician.

In addition to requiring fewer resources than traditional pentesting, the disclosed systems and methods speed up pentesting through pre-configuration of scanning and vulnerability capturing or reporting. Additionally, the disclosed systems and methods allow for pentesting by less skilled users with the results later peer-reviewed by subject matter experts (SMEs). As a result, pentests can be performed without needing resources on-site (or at least reducing the time on-site), thereby reducing travel time and overhead costs.

Figure 1A:
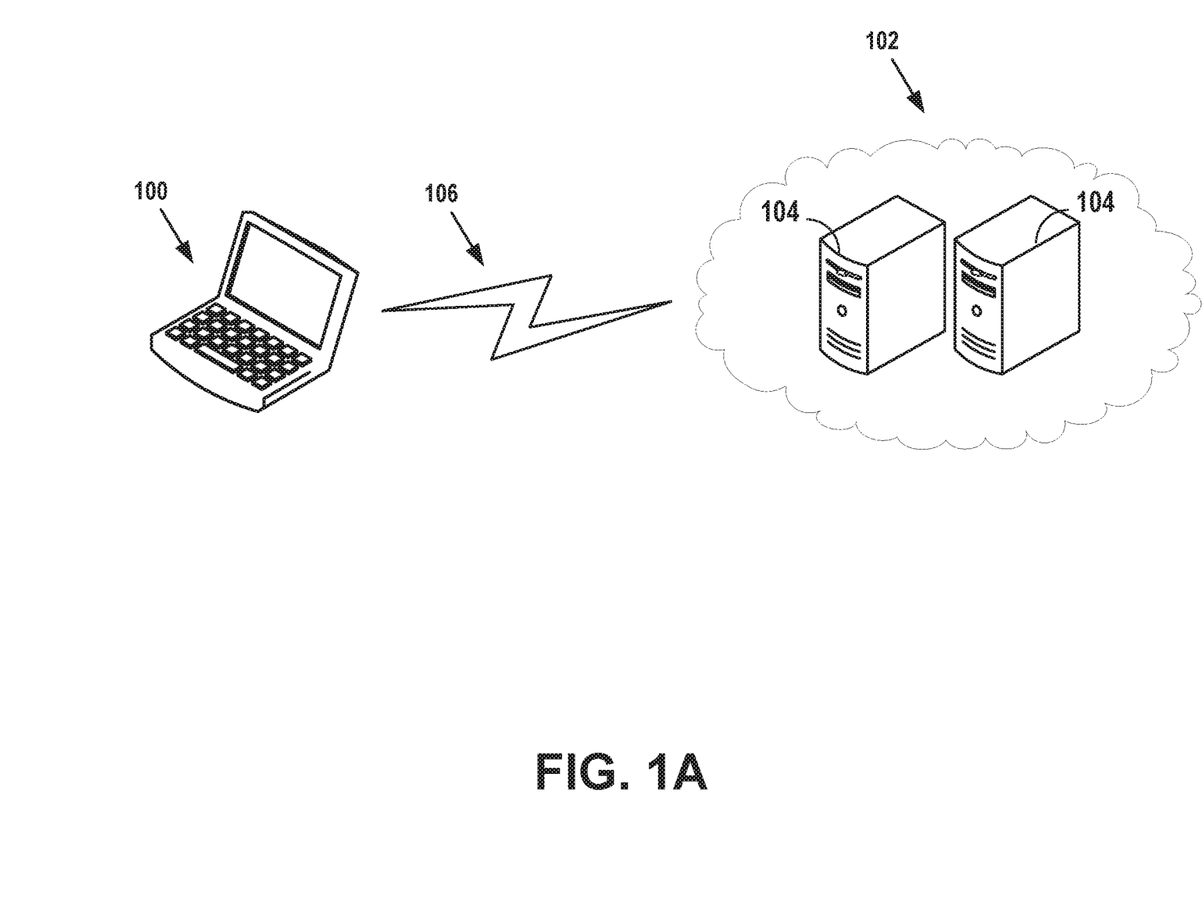
FIGS. 1A and 1B each illustrate a system, according to some implementations.

FIG. 1A depicts an example pentesting device 100, according to some implementations. In an implementation, the pentesting device 100 is a self-contained mobile computing device. The pentesting device 100 is designed to be powered by either a mobile battery pack (for example, 20000 mA battery pack) or by a direct mains connection. The pentesting device 100, and its components, may have a small form factor that allows the penetration testing device to be disposed, conveniently shipped, or easily distributed to desired locations. In an example, the pentesting device 100 takes the form of ABOX Raspberry Pi 3 Model B minicomputer. Additionally, the pentesting device 100 may be housed in a rugged case that provides the penetration testing device with robustness so that it may be deployed in any type of environment (for example, physically remote environments or environments that are difficult to access). The rugged case may incorporate any cables that the pentesting device 100 may need to operate, such as power cables and connector cables.

In an implementation, the pentesting device 100 may be configured to perform a pentest on a target application 102. The target application 102 may include networks (for example, Wi-Fi networks, LANs, WANs, and cloud networks), hardware, software, data centers, web applications, servers (for example, application servers and Internet servers), virtual machines, operating systems, communication devices (for example, routers, switches), internet of things (IOT) devices, among other components. For instance, in the example of FIG. 1A, the target application 102 includes a plurality of interconnected servers 104.

In an implementation, the pentesting device 100 may operate in a headless mode. In this mode, the pentesting device 100 can autonomously perform a pentest on the target application 102. In order to perform the pentest, a user, skilled or otherwise, may connect the pentesting device 100 to the target application 102. As shown in FIG. 1A, the pentesting device 100 may be coupled to the target application 102 via a connection 106. The connection 106 may be a wired or a wireless communications link that directly couples the pentesting device 100 to the target application 102. To facilitate the connection 106, the pentesting device 100 may include one or more connection ports, such as a serial port, an Ethernet port, and a Universal Serial Bus (USB). Furthermore, the pentesting device 100 may support a plurality of communication protocols, and therefore, may communicate with the target application 102 using any of one or more protocols implemented by the target application 102.

The pentesting device 100 may be configured to perform a pentest on the target application 102 by executing a pentesting script customized for the target application. In an implementation, the pentesting script may be a preconfigured script that is stored in a memory of the pentesting device 100. The preconfigured script may be prepared by a skilled technician that customizes the pentesting script for the target application 102. Customizing the pentesting script for the target application may include preparing a series of tests to detect vulnerabilities in the target application 102. The pentesting script may then be stored in a memory of the pentesting device 100. In some examples, the pentesting device 100 may receive the pentesting script by way of a removable storage medium coupled to the pentesting device. This feature allows the pentesting device 100 to be reconfigured with different pentests (such as pentests that are customized for different target applications).

In another implementation, the pentesting device 100 may generate the pentesting script. In an example, the pentesting script is generated based on a template script that is stored in the memory of the pentesting device 100. The template script may be a pentesting script that is a complete pentesting script but for one or more parameter placeholders. The one or more parameter placeholders may be replaced with one or more values that customize the template script to the target application 102. In one embodiment, the parameter values may be determined by probing or scanning the target application 102. For instance, one or more parameters may include identifying information of the target application (for example, IP addresses and DNS details). In another embodiment, the information could be determined from a configuration file or script that includes configuration details of the target application 102. The configuration file may be received by way of a removable storage medium coupled to the pentesting device 100. The configuration file may include IP ranges, DNS details, scan options, and an intensity setting (that controls depth of testing).

Once the pentesting device 100 is connected to the target application 102, the user may provide the penetration testing device with an instruction to perform the pentest. In an example, the user may provide the instruction by manually pressing a dedicated button on the pentesting device 100. In another example, a display (for example, a Quimat 3.5" touch screen) of the pentesting device 100 may display a graphical user interface (GUI) that allows the user to interact with the penetration testing device. The GUI may include a selectable icon that, when selected, indicates an instruction to perform the pentest. In yet another example, the pentesting device 100 may receive the instruction from another computing device (for example, a mobile device of the user). Because the pentesting device 100 is configured to initiate a pentest based on a single input from a user, the penetration testing device can also be referred to as a "one-touch" pentesting device.

Once the pentesting device 100 receives the instruction, the pentesting device 100 may perform the pentest on the target application 102. In an example, the pentesting device 100 may perform the pentest by executing the pentesting script. The pentesting script may include instructions that cause the pentesting device 100 to simulate an attack on the target application 102 in order to detect security vulnerabilities in the application. The attack may involve performing one or more tests in a particular order, and based on the outcome of each test, performing further tests. Examples of the security vulnerabilities tested for by the pentesting device 100 include vulnerabilities in protocols (for example, HTTPS, DNS, and ICMP), backdoors, and communication channels. Additionally, the pentesting device 100 may test for vendor specific default credentials for web interfaces and remote login prompts.

In one example, the pentesting script may cause the pentesting device 100 to scan the target application 102, perform a series of tests to identify and evaluate potential vulnerabilities, validate false positives, and document the findings in a report. In particular, the pentesting device 100 may scan the target application 102 using tools such as network scanners/mappers. Then, the pentesting device 100 may use the results of the scans to inform analytical functions about what follow-on tests to perform. Additionally the pentesting device 100 may evaluate whether any findings suffer from known exploitable vulnerabilities or default credentials.

After the pentest is complete, the pentesting device 100 may generate a report of the findings. The report may include information indicative of security vulnerabilities in the target application 102. This information may include the vulnerabilities detected, an impact level of each detected vulnerability, the components of the target application 102 that are impacted by the vulnerabilities, the nature of the vulnerabilities, and potential corrective or remedial actions, such as patches or fixes to the vulnerabilities.

As explained, the pentesting device 100 may alternatively operate in a remote mode. In this mode, the pentesting device 100 facilitates for a skilled technician to remotely perform the pentest, perhaps by establishing a secure connection between the pentesting device 100 and a computing device operated by the skilled technician.

Figure 1B:
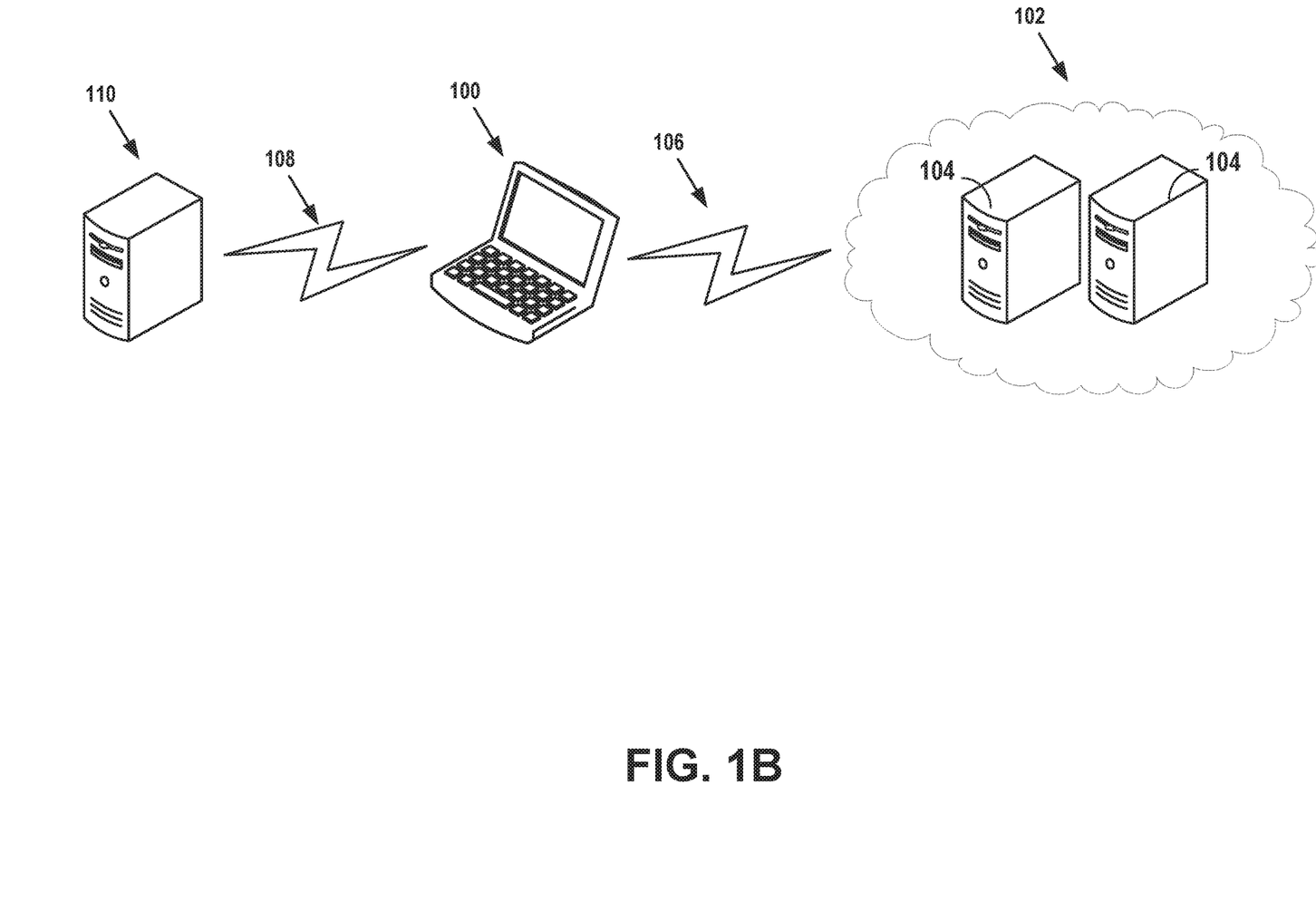

FIG. 1B depicts the pentesting device 100 operating in the remote mode, according to some implementations. As shown in FIG. 1B, like in FIG. 1A, the pentesting device 100 is coupled to the target application 102 via the connection 106. However, in this example, the pentesting device 100 establishes a secure connection 108 with a computing device 110 that is operated by a skilled user. Doing so allows the skilled user to remotely control the pentesting device 100 to perform the pentest.

In an implementation, the pentesting device 100 may be configured with a virtual private network endpoint (VPN). Accordingly, the secure connection 108 may be a VPN connection between the pentesting device 100 and the remote computing device 110. In another implementation, the pentesting device 100 may be configured to establish a secure connection over wireless communication networks (for example, GSM networks). In this implementation, the penetration device 100 may include a cellular network extension board (for example, a PI SIM800 GSM/GPRS board). And in this implementation, the secure connection 108 is a secure wireless communication network connection.

Figure 2:
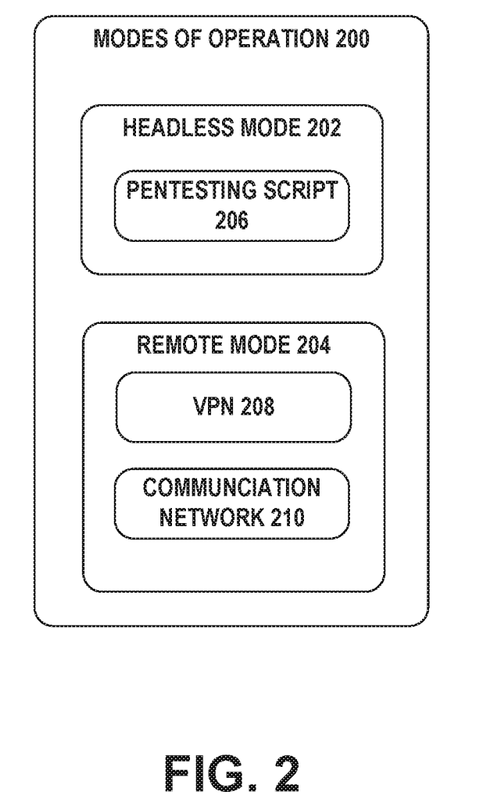
FIG. 2 illustrates a block diagram of modes of operation of a penetration testing device, according to some implementations.

FIG. 2 illustrates the modes of operation of the pentesting device 100, according to some implementations. As shown in FIG. 2, the pentesting device 100 is configured to operate in a headless mode 202 and a remote mode 204. In the headless mode 202, the pentesting device 100 may perform a pentest by executing the pentesting script 206. And in the remote mode 204, the pentesting device 100 may be configured to establish a secure connection with a remote computing device, perhaps using VPN 208 or wireless communication network 210.

Figure 3A:
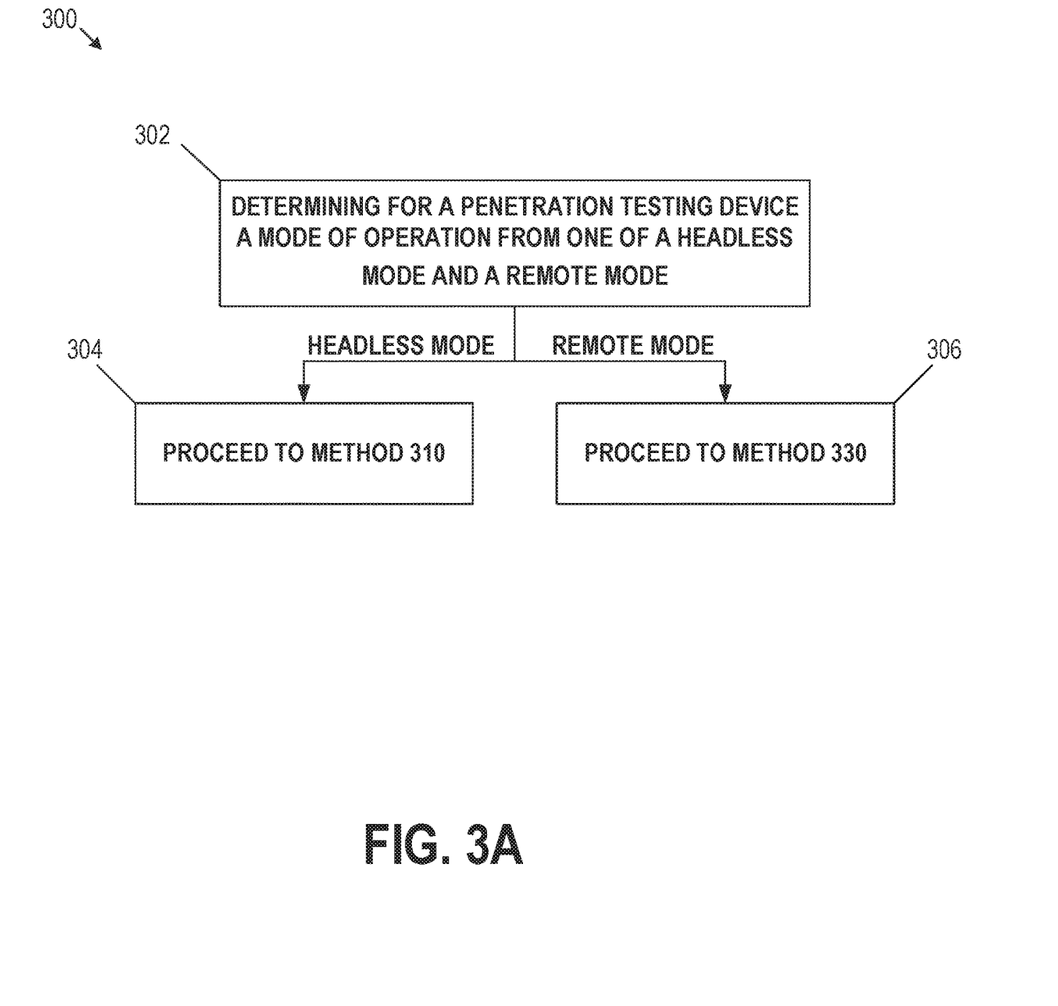
FIGS. 3A, 3B, and 3C each illustrate a flowchart showing an example method, according to some implementations.
Figure 3B:
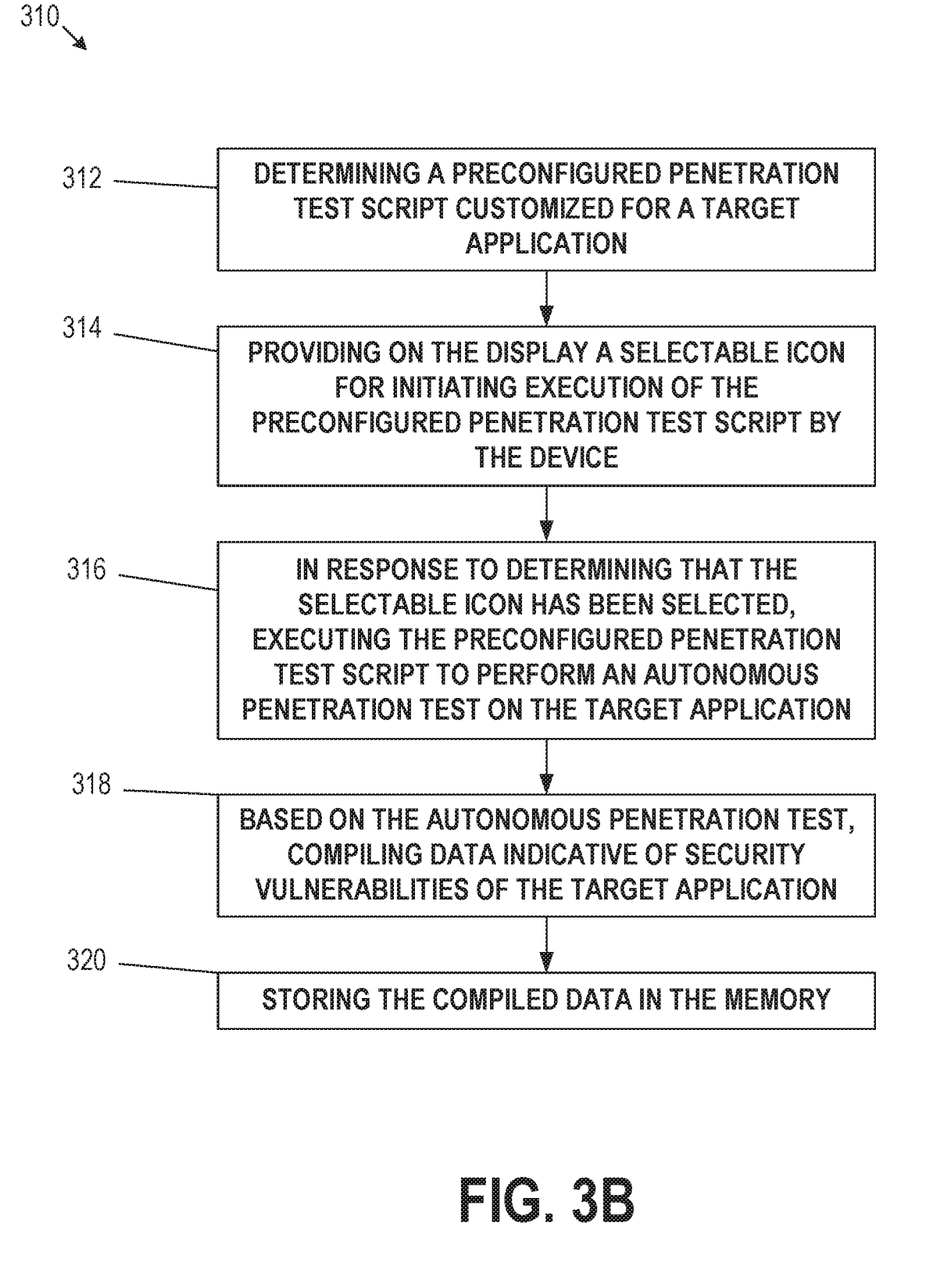
Figure 3C:
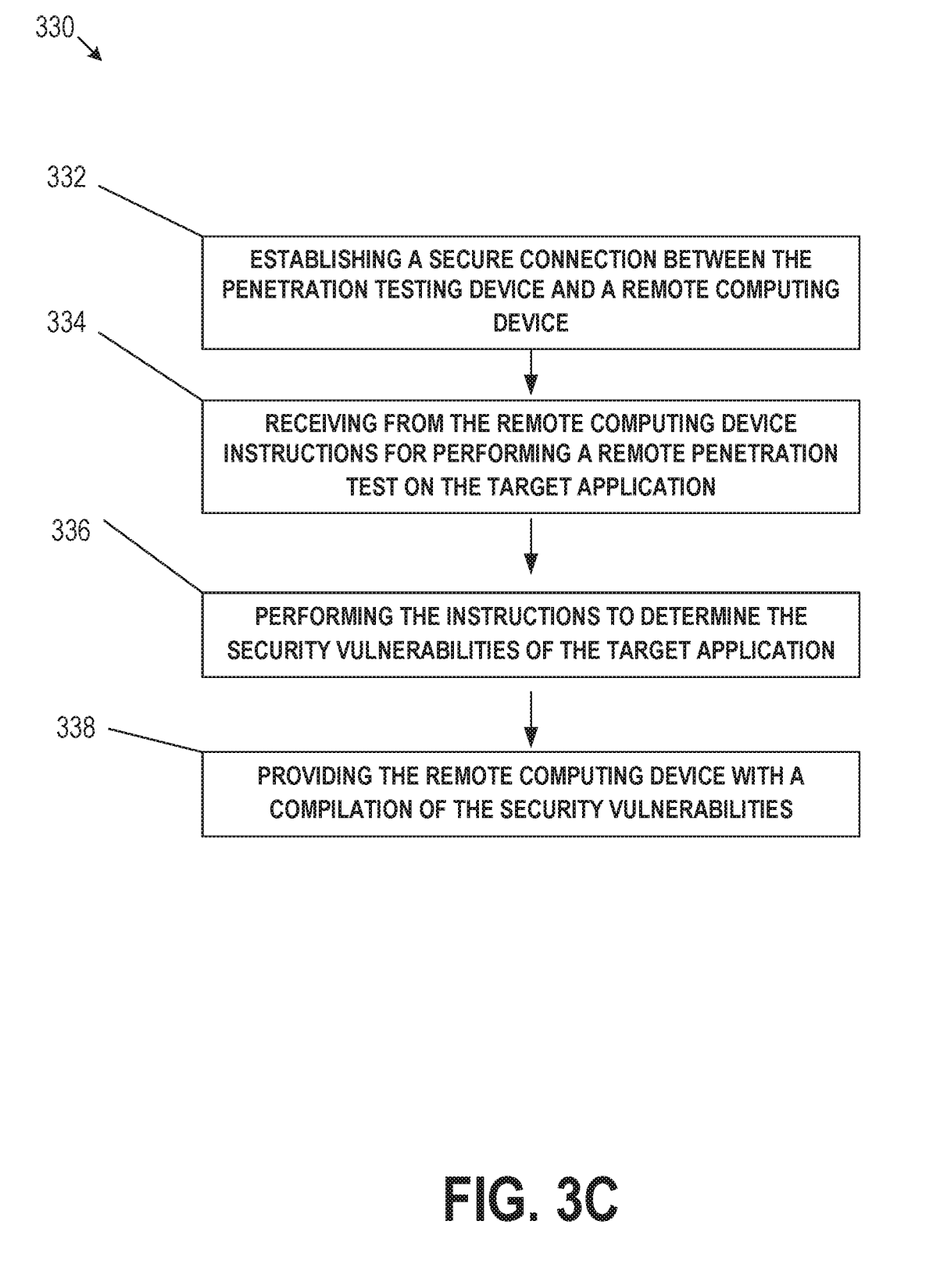

FIGS. 3A, 3B, and 3C illustrate flowcharts of example methods 300, 310, 330 of operating a pentesting device, according to some implementations. For clarity of presentation, the description that follows generally describes the methods in the context of the other figures in this description. For example, the methods can be performed by the penetration device 100 described in FIGS. 1A-1B. However, it will be understood that the methods may be performed, for example, by any suitable system, environment, software, and hardware, or a combination of systems, environments, software, and hardware, as appropriate. In some implementations, various steps of the methods can be run in parallel, in combination, in loops, or in any order.

FIG. 3A illustrates method 300 of operating a pentesting device, according to some implementations. The pentesting device may be deployed by an enterprise in order to perform a pentest on a target application. As explained, the pentesting device is configured to operate in one of two modes. In the headless mode, the pentesting device can autonomously perform a pentest on a target application. And in the remote mode, the pentesting device can allow a skilled user to remotely control the penetration testing device to perform a pentest on a target application.

Method 300 starts at step 302. In step 302, method 300 involves determining for a pentesting device a mode of operation from one of a headless mode and a remote mode. In one implementation, the pentesting device may receive an input, perhaps from a user or another computing device, of a desired mode of operation. The user may, for example, select the operating mode based on a type of the target application. For instance, if the target application is an enclaved network where there is no external network connectivity, the user may select the headless mode. In response to receiving the user input, the pentesting device may determine to operate in the mode specified in the input.

In another implementation, determining the mode of operation may be based on one or more factors. One example factor is the resources that are available resources to the enterprise, such as skilled workers, network resources, among other examples. For instance, the pentesting device may determine to operate in a remote mode if there are skilled workers available to remotely operate the penetration testing device. The skilled workers may be available via any network connection and can remotely access the pentesting device to operate it manually. However, if no skilled workers are available, then the pentesting device may determine to operate in the headless mode. No skilled resources available means that either no available resource in the organization or that any resources that are available are technically unable to connect to the pentesting device due to intermediary firewalls/air-gaps or other restrictions.

As shown in FIG. 3A, if the pentesting device selects the headless mode, then method 300 moves to step 304 where the pentesting device performs method 310 of operating in the headless mode. Conversely, if the pentesting device selects the remote mode, then method 300 moves to step 306 where the pentesting device performs method 330 of operating in the remote mode.

FIG. 3B illustrates method 310 of operating the pentesting device in the headless mode, according to some implementations. The headless mode allows the pentesting device to provide pentesting in locations where remote testing facilities are unavailable or where deploying physical personnel is either considered too costly, time consuming, or too dangerous. In order to provide pentesting in such locations, the pentesting device may be placed in situ at a location or may be shipped to a location, perhaps by mail or other means. Once at the location, the pentesting device may be coupled directly to the target application, perhaps via a network port of the target application.

At step 312, method 310 involves determining a pentesting script customized for a target application. The pentesting script may include instructions for the pentesting device to scan the target application and perform a series of tests to identify and evaluate potential vulnerabilities, validate false positives, and document findings in a report. The pentesting script may also include an intensity setting that allows for control of depth of testing.

In an implementation, the pentesting script may be a preconfigured script that is stored in a memory of the pentesting device. The preconfigured script may be prepared by a skilled worker that customizes the script for the target application. Customizing the script for the target application may include preparing a series of tests to detect vulnerabilities in the target application. The script may then be stored in a memory of the pentesting device. In some examples, the pentesting device may receive the preconfigured script by way of a removable storage medium coupled to the pentesting device. This feature allows the pentesting device to be reconfigured with different pentests.

In another implementation, the pentesting device generates the pentesting script. In an example, the pentesting script is generated based on a template script that is stored in the memory of the pentesting device. The template script may be a pentesting script that is a complete pentesting script but for one or more parameter placeholders that may be replaced with one or more values that customize the template script to the target application. In an example, the parameter values may be determined by probing or scanning the target application. For instance, one or more parameters may include identifying information of the target application (for example, IP addresses and DNS details). In another example, the parameter values may be determined from a configuration file.

At step 314, method 310 involves, in response to receiving an instruction to perform an autonomous pentest, executing the pentesting script to perform the autonomous pentest on the target application. In an implementation, the pentesting device may receive the instruction from a user that is operating the penetration testing device. By way of example, the pentesting device may display on its display a GUI that includes a selectable icon. The user selecting the icon may provide the pentesting device with an instruction to perform the pentest. Because the pentesting can be initiated by a single input, the pentesting device has a "one-touch" interface that allows any user, skilled or otherwise, to perform a pentest using the penetration testing device.

The pentesting device executing the pentesting script involves the penetration testing device performing instructions specified in the script. In an example, the pentesting device may scan the target application. The pentesting device may then use the results of the scan(s) to inform analytical functions about the follow-on tests to perform. The pentesting device may then evaluate whether one of the entities in the target application suffers from known exploitable vulnerabilities or default credentials.

Within examples, the pentesting script may specify a level or depth of testing. The depth of testing performed at any time will be dependent upon a desired scope and may be configured into the configuration file. The following are example levels of testing. A first level is referred to as "Level 1" or "Asset Discovery." In this level, the pentesting script may cause the pentesting device to determine which assets within the assessment scope are active within the target application (for example, a target network). In an example, this may involve using a series of Address Resolution Protocol (ARP), Internet Communication Messaging Protocol (ICMP) and Transmission Control Protocol (TCP) scans to verify the state of a given asset. This will flag all potential assets (IP addresses) as either [Available] or [Unavailable].

A second level is referred to as "Level 2" or "Asset Investigation." In this level, for all Level 1 assets that are [Available], the pentesting script may include instructions to perform detailed TCP and UDP scans to identify available services. This will flag all [Available] assets as offering [x] TCP services and [y] UDP services and records them by TCP and UDP port number against the Available Asset's IP address.

A third level is referred to as "Level 3" or "Service Interrogation." In this level, for each [Available] asset, the pentesting script may include instructions to perform a detailed scan of each TCP and UDP service in order to identify "Service Type" and "Version." This will log all available service descriptors and version numbers against each TCP/UDP service for each [Available] asset.

A sublevel of Level 3 is referred to as "Level 3a" or "Classification." In this level, for each Level 3 service, the pentesting script may include instructions classify into similar groupings such that all identified services of the same technology type are clustered together in one data set. For example, all HTTP services are grouped in one cluster, all DNS are grouped in another, and so on.

Another sublevel of Level 3 is referred to "Level 3b" or "Assessment." In this level, for each Level 3a Service Type, the pentesting script may include instructions to perform service type specific scans and vulnerability assessments. This level will log potential vulnerabilities and authentication requests that may be subject to brute force or automated exploitation in the subsequent levels.

A fourth level is referred to as "Level 4" or "Exploitation." In this level, for each potential vulnerability, the pentesting script may include instructions to perform automated exploitation tests.

A fifth level is referred to as "Level 5" or "Clean Up." In this level, the pentesting script may include instructions to ensure that any residual artefacts from the scanning are cleaned up from the target system.

A sixth level is referred to as "Level 6" or "Reporting." In this level, the pentesting script may include instructions to automatically generate the report into an appropriate report format and submit report and raw results to a central repository.

A seventh level is referred to as "Level 7" or "Archive and Clean-Up." In this level, the pentesting script may include instructions to return the pentesting device to its default state, awaiting new instructions.

At step 316, method 310 involves based on results of the autonomous pentest, compiling data indicative of security vulnerabilities in the target application. In this step, the pentesting device generates a report that includes the results of the pentest, such as the vulnerabilities detected, an impact level of each detected vulnerability, the components of the target application that are impacted by the vulnerabilities, the nature of the vulnerabilities, and potential corrective or remedial actions, such as patches or fixes to the vulnerabilities. The data indicative of the impacted components may include IP addresses and physical locations of the components. Additionally, the report may include details of the results from each the testing levels described above. Additionally, the report may include an automated risk rating of each finding based on impact, ease, and visibility. These ratings and other information in the report may later be adjusted, as necessary, by a skilled user to ensure accuracy of the report.

At step 318, method 310 involves storing the compiled report in the memory of the pentesting device. The compiled report may later be accessed by a subject matter expert in order to review the results of the pentest. The compiled report may also be sent to another computing device by the pentesting device once the pentesting device has access to a communications network.

The example method 310 shown in FIG. 3B can be modified or reconfigured to include additional, fewer, or different steps (not shown in FIG. 3B), which can be performed in the order shown or in a different order.

In an example, each time a pentest is performed, information associated with the pentest (for example, the customized script, the configuration file, and the results of the pentest) may be stored in a central repository in a memory of the pentesting device, a central server, or other computing device/server. If an enterprise includes more than one pentesting device, one or more of the penetration testing devices may report the pentest data to the central repository. In an implementation, the information stored in the central repository may serve as historical data. As historical data is gathered, the data could be used to improve or speed up future pentests. For instance, the results of a previously performed pentest on a particular target application could be used to speed up a subsequently performed pentest on that target application.

In some implementations, one or more of the steps shown in FIG. 3B can be repeated or reiterated, for example, until a terminating condition is reached. In some implementations, one or more of the individual steps shown in FIG. 3B can be executed as multiple separate steps, or one or more subsets of the steps shown in FIG. 3B can be combined and executed as a single step. In some implementations, one or more of the individual steps shown in FIG. 3B may also be omitted from the example method 310.

FIG. 3C illustrates method 330 of operating the pentesting device in the remote mode, according to some implementations. The remote mode allows skilled users to perform pentesting in locations where deploying physical personnel is either considered too costly, time consuming, or too dangerous. In order to provide pentesting in such locations, the pentesting device may be placed in situ at the location or may be shipped to the location, perhaps by mail or other means. At the location, the pentesting device may be coupled directly to the target application via a physical connection, perhaps via a network port of the target application.

At step 332, method 330 involves establishing a secure connection between the pentesting device and a remote computing device. In this step, once the pentesting device is coupled to a target application, the pentesting device may seek to establish a secure connection with a remote computing device that is operated by a skilled technician to allow the technician to remotely control the pentesting device. In an implementation, the pentesting device may be configured with a virtual private network endpoint. Accordingly, a VPN connection may be established between the pentesting device and the remote computing device to allow the skilled technician (who has access through boundary firewalls) to remote into the pentesting device. In another implementation, the pentesting device may be configured to establish a secure connection over wireless communication networks (for example, GSM networks). In this implementation, the penetration device may include a cellular network extension board (for example, a PI SIM800 GSM/GPRS board).

At step 332, method 330 may involve receiving from the remote computing device instructions for performing a remote pentest on the target application. The instructions may cause the pentesting device to scan the target application, perform a series of tests to identify and evaluate potential vulnerabilities, and validate false positives, among other operations.

At step 336, method 330 may involve performing the instructions to determine the security vulnerabilities of the target application. And at step 338, method 330 may involve providing the remote computing device with a compilation of the security vulnerabilities. In this step, the pentesting device generates a report that includes the results of the pentest, such as the vulnerabilities detected, an impact level of each detected vulnerability, the components of the target application that are impacted by the vulnerabilities, the nature of the vulnerabilities, and potential corrective or remedial actions, such as patches or fixes to the vulnerabilities. The data indicative of the impacted components may include IP addresses and physical locations of the components.

The example method 330 shown in FIG. 3C can be modified or reconfigured to include additional, fewer, or different steps (not shown in FIG. 3C), which can be performed in the order shown or in a different order. In some implementations, one or more of the steps shown in FIG. 3C can be repeated or reiterated, for example, until a terminating condition is reached. In some implementations, one or more of the individual steps shown in FIG. 3C can be executed as multiple separate steps, or one or more subsets of the steps shown in FIG. 3C can be combined and executed as a single step. In some implementations, one or more of the individual steps shown in FIG. 3C may also be omitted from the example method 330.

Figure 4:
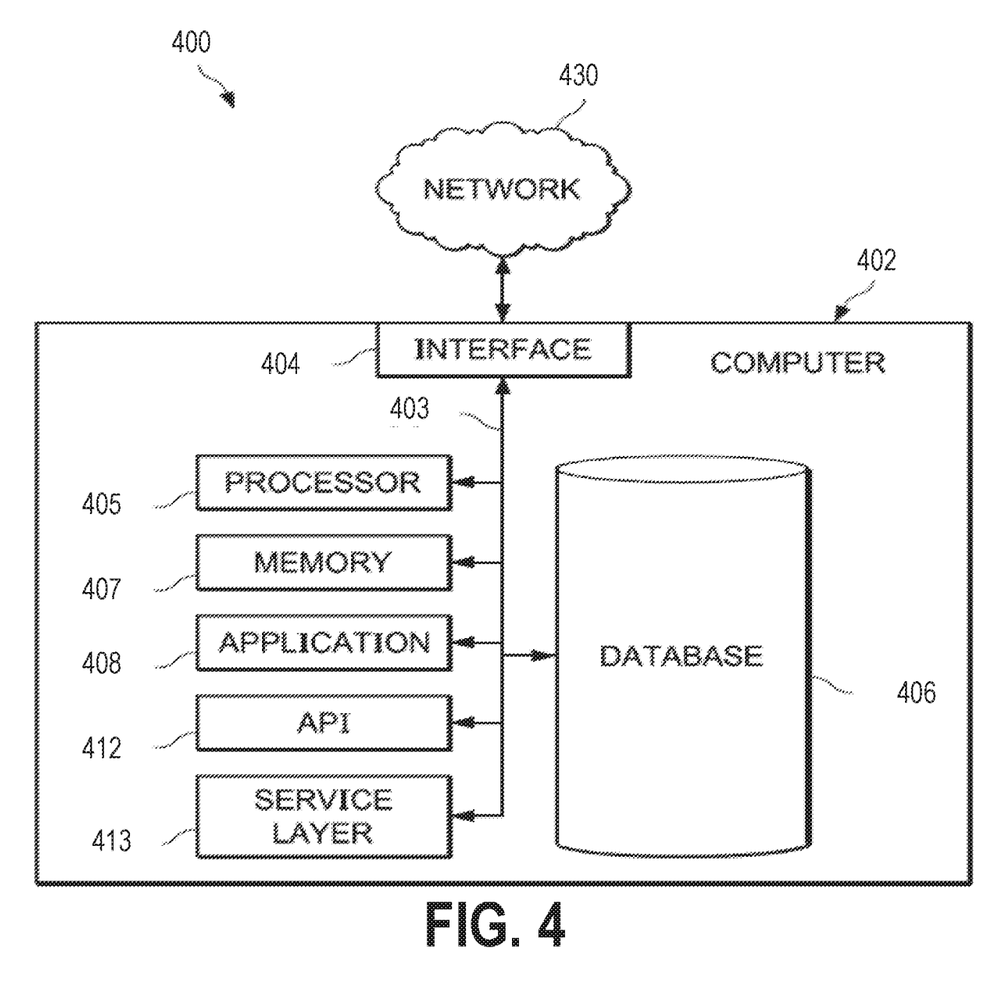
FIG. 4 illustrates a block diagram showing an example computer system used to provide computational functionalities associated with described algorithms, methods, functions, processes, flows, and procedures as described in the instant disclosure, according to some implementations.

FIG. 4 is a block diagram of an example computer system 400 used to provide computational functionalities associated with described algorithms, methods, functions, processes, flows, and procedures as described in the instant disclosure, according to an implementation. The illustrated computer 402 is intended to encompass any computing device such as a server, desktop computer, laptop/notebook computer, wireless data port, smart phone, personal data assistant (PDA), tablet computing device, or one or more processors within these devices, or any other suitable processing device, including physical or virtual instances (or both) of the computing device. Additionally, the computer 402 may comprise a computer that includes an input device, such as a keypad, keyboard, or touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, or global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, or streaming data server, or other server (or a combination of servers).

The computer 402 can receive requests over network 430 from a client application (for example, executing on another computer) and respond to the received requests by processing the received requests using the appropriate software application(s). In addition, requests may also be sent to the computer 402 from internal users (for example, from a command console or by other appropriate access methods), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413). The API 412 may include specifications for routines, data structures, and object classes. The API 412 may be either computer-language independent or dependent and may refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, or C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module, without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems that are connected to the network 430 (whether illustrated or not) in a distributed environment. Generally, the interface 404 comprises logic encoded in software or hardware (or a combination of software and hardware) and is operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, or conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402.

The computer 402 also includes a memory 407 that can hold data for the computer 402 or other components (or a combination of both) that can be connected to the network 430 (whether illustrated or not). For example, memory 407 can be random access memory (RAM), read only memory (ROM), optical, magnetic, and the like, storing data consistent with this disclosure. In some implementations, memory 407 can be a combination of two or more different types of memory (for example, a combination of RAM and magnetic storage) according to particular needs, desires, or particular implementations of the computer 402 and the described functionality. Although illustrated as a single memory 407 in FIG. 4, two or more memories 407 (of the same or a combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, or applications. Further, although illustrated as a single application 408, the application 408 may be implemented as multiple applications 408 on the computer 402. In addition, although illustrated as integral to the computer 402, in alternative implementations, the application 408 can be external to the computer 402.

There may be any number of computers 402 associated with, or external to, a computer system containing computer 402, each computer 402 communicating over network 430. Further, the term "client", "user", and other appropriate terminology may be used interchangeably, as appropriate, without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS, or any other suitable conventional operating system.

A computer program, which may also be referred to or be described as a program, software, a software application, a module, a software module, a script, or code can be written in any form of programming language, including compiled or interpreted languages, or declarative or procedural languages, and it can be deployed in any form, including as a stand-alone program or as a module, component, or subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, or methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, PDA, a mobile audio or video player, a game console, a global positioning system (GPS) receiver, or a portable storage device, for example, USB flash drive, to name just a few.

Computer readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20, or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

I claim:

1. A penetration testing device comprising:
   a memory; and
   a processor that is arranged to perform operations including:
      determining availability of one or more penetrating testing resources for conducting a penetration test;
      determining, based on the availability, a mode of operation for the penetration testing device from one of a headless mode and a remote mode;
      if the determined mode of operation is the headless mode:
         determining a penetration test script customized for a target application;
         in response to receiving an instruction to perform an autonomous penetration test, executing the penetration test script to perform the autonomous penetration test on the target application;
         based on results of the autonomous penetration test, compiling data indicative of security vulnerabilities in the target application; and
         storing the compiled data in the memory; and
      if the determined mode of operation is the remote mode:
         establishing a secure connection between the penetration testing device and a remote computing device;
         receiving from the remote computing device instructions for performing a remote penetration test on the target application;
         performing the remote penetration test instructions to determine the security vulnerabilities of the target application; and
         providing the remote computing device with a compilation of the security vulnerabilities,
      wherein determining the mode of operation based on the availability comprises:
         in response to determining the one or more penetrating testing resources are available, determining that the mode of operation is the remote mode; and
         in response to determining the one or more penetrating testing resources are not available, determining that the mode of operation is the headless mode.

2. The penetration testing device of claim 1, wherein determining the penetration test script for the target application comprises:
   receiving a preconfigured penetration test script from a removable media device connected to the penetration testing device.

3. The penetration testing device of claim 1, wherein determining the penetration test script comprises:
   providing one or more values for one or more parameters in a template script stored in the memory; and
   based on the one or more values and the template script, generating the penetration test script.

4. The penetration testing device of claim 3, wherein the one or more parameters comprise: an IP range, DNS data, a scan option, and an intensity setting.

5. The penetration testing device of claim 1, wherein the penetration testing device is housed in a rugged case, and wherein one or more connectors are integrated into the rugged case.

6. The penetration testing device of claim 1, wherein information indicative of one or more protocols are stored in the memory, and wherein the penetration testing device supports the one or more protocols.

7. The penetration testing device of claim 1, wherein executing the penetration test script comprises:
   scanning the target application to map the target application;
   based on a map of the target application, performing a series of tests to identify and evaluate potential vulnerabilities; and
   determining which of the potential vulnerabilities are the security vulnerabilities.

8. The penetration testing device of claim 7, wherein the series of tests comprise a test to validate false positives.

9. The penetration testing device of claim 7, wherein the series of tests evaluate whether any of the potential vulnerabilities are known exploitable vulnerabilities.

10. The penetration testing device of claim 7, wherein the series of tests detect vendor specific default credentials and remote login prompts.

11. The penetration testing device of claim 1, wherein the penetration testing device further comprises a display, and wherein in response to receiving the instruction to perform the autonomous penetration test, executing the penetration test script to perform the autonomous penetration test on the target application comprises:
   providing on the display a selectable icon for initiating execution of a preconfigured penetration test script by the penetration testing device; and
   in response to determining that the selectable icon has been selected, generating the instruction to perform the autonomous penetration test.

12. A non-transitory, computer-readable medium storing one or more instructions executable by a computer system to perform operations comprising:
   determining availability of one or more penetrating testing resources for conducting a penetration test;
   determining, based on the availability and for a penetration testing device, a mode of operation from one of a headless mode and a remote mode;
   if the determined mode of operation is the headless mode:
      determining a penetration test script customized for a target application;
      in response to receiving an instruction to perform an autonomous penetration test, executing the penetration test script to perform the autonomous penetration test on the target application;

based on results of the autonomous penetration test, compiling data indicative of security vulnerabilities in the target application; and storing the compiled data in a memory of the penetration testing device; and if the determined mode of operation is the remote mode:

establishing a secure connection between the penetration testing device and a remote computing device;

receiving from the remote computing device instructions for performing a remote penetration test on the target application;

performing the remote penetration test instructions to determine the security vulnerabilities of the target application; and providing the remote computing device with a compilation of the security vulnerabilities, wherein determining the mode of operation based on the availability comprises:

in response to determining the one or more penetrating testing resources are available, determining that the mode of operation is the remote mode; and in response to determining the one or more penetrating testing resources are not available, determining that the mode of operation is the headless mode.

13. The non-transitory, computer-readable medium of claim 12, wherein determining the penetration test script for the target application comprises:

receiving a preconfigured penetration test script from a removable media device connected to the penetration testing device.

14. The non-transitory, computer-readable medium of claim 12, wherein determining the penetration test script comprises:

providing one or more values for one or more parameters in a template script stored in the memory; and based on the one or more values and the template script, generating the penetration test script.

15. The non-transitory, computer-readable medium of claim 14, wherein the one or more parameters comprise: an IP range, DNS data, a scan option, and an intensity setting.

16. The non-transitory, computer-readable medium of claim 12, wherein the penetration testing device is housed in a rugged case, and wherein one or more connectors are integrated into the rugged case.

17. A method comprising:

determining availability of one or more penetrating testing resources for conducting a penetration test;

determining, based on the availability and for a penetration testing device, a mode of operation from one of a headless mode and a remote mode;

if the determined mode of operation is the headless mode:

determining a penetration test script customized for a target application;

in response to receiving an instruction to perform an autonomous penetration test, executing the penetration test script to perform the autonomous penetration test on the target application;

based on results of the autonomous penetration test, compiling data indicative of security vulnerabilities in the target application; and storing the compiled data in a memory of the penetration testing device; and if the determined mode of operation is the remote mode:

establishing a secure connection between the penetration testing device and a remote computing device;

receiving from the remote computing device instructions for performing a remote penetration test on the target application;

performing the remote penetration test instructions to determine the security vulnerabilities of the target application; and providing the remote computing device with a compilation of the security vulnerabilities, wherein determining the mode of operation based on the availability comprises:

in response to determining the one or more penetrating testing resources are available, determining that the mode of operation is the remote mode; and in response to determining the one or more penetrating testing resources are not available, determining that the mode of operation is the headless mode.

18. The method of claim 17, wherein determining the penetration test script for the target application comprises:

receiving a preconfigured penetration test script from a removable media device connected to the penetration testing device.

19. The method of claim 17, wherein determining the penetration test script comprises:

providing one or more values for one or more parameters in a template script stored in the memory; and based on the one or more values and the template script, generating the penetration test script.

20. The method of claim 19, wherein the one or more parameters comprise: an IP range, DNS data, a scan option, and an intensity setting.

* * * * *